US005096669A

United States Patent [19]

Lauks et al.

[11] Patent Number: 5,096,669

[45] Date of Patent: Mar. 17, 1992

[54] DISPOSABLE SENSING DEVICE FOR REAL TIME FLUID ANALYSIS

[75] Inventors: Imants R. Lauks, Yardley, Pa.; Henry J. Wieck, Brooklyn, N.Y.; Michael P. Zelin; Philip Blyskal, both of Plainsboro, N.J.

[73] Assignee: I-Stat Corporation, Princeton, N.J.

[21] Appl. No.: 245,102

[22] Filed: Sep. 15, 1988

[51] Int. Cl.[5] .............................................. G01N 27/30

[52] U.S. Cl. ...................................... 422/61; 204/403; 204/409; 324/438; 324/439; 422/61; 422/76

[58] Field of Search ............................ 422/61, 63, 68; 204/403, 409; 324/438, 439

[56] References Cited

U.S. PATENT DOCUMENTS 3,640,267 2/1972 Hurtig et al. ...................... 422/68 X
3,697,227 10/1972 Goldstein et al. ................ 422/68 X
4,066,414 1/1978 Selby .................................. 422/102
4,301,412 11/1981 Hill et al. ......................... 324/448 X
4,301,414 11/1981 Hill et al. ............................ 324/446
4,312,833 1/1982 Clough et al. ........................ 422/30
4,436,610 3/1984 Enzer et al. .................... 204/409 X
4,615,340 10/1986 Cronenberg et al. .......... 204/415 X
4,624,929 11/1986 Ullman .............................. 422/61 X
4,654,127 3/1987 Baker et al. ....................... 422/68 X
4,756,884 7/1988 Hillman et al. ........................ 422/73

*Primary Examiner*—Robert J. Warden
*Assistant Examiner*—Amalia Santiago
*Attorney, Agent, or Firm*—Pennie & Edmonds

[57] ABSTRACT

A system comprising a disposable device and hand held reader can perform a variety of electrochemical measurements on blood or other fluids. In operation, a fluid sample is drawn into the disposable device through an orifice by capillary action. The orifice is sealed off and the disposable device is inserted into the reader. The reader which controls the test sequence and flow of fluid causes a calibrant pouch located inside the device to be pierced, releasing the calibrant fluid to flow across the sensor arrays to perform calibration. Next an air bladder located in the device is depressed, forcing the sample across the sensors where measurements are performed and read by the reader which performs the calibrations. Once the measurements are made, the device can be withdrawn from the reader and discarded.

33 Claims, 10 Drawing Sheets

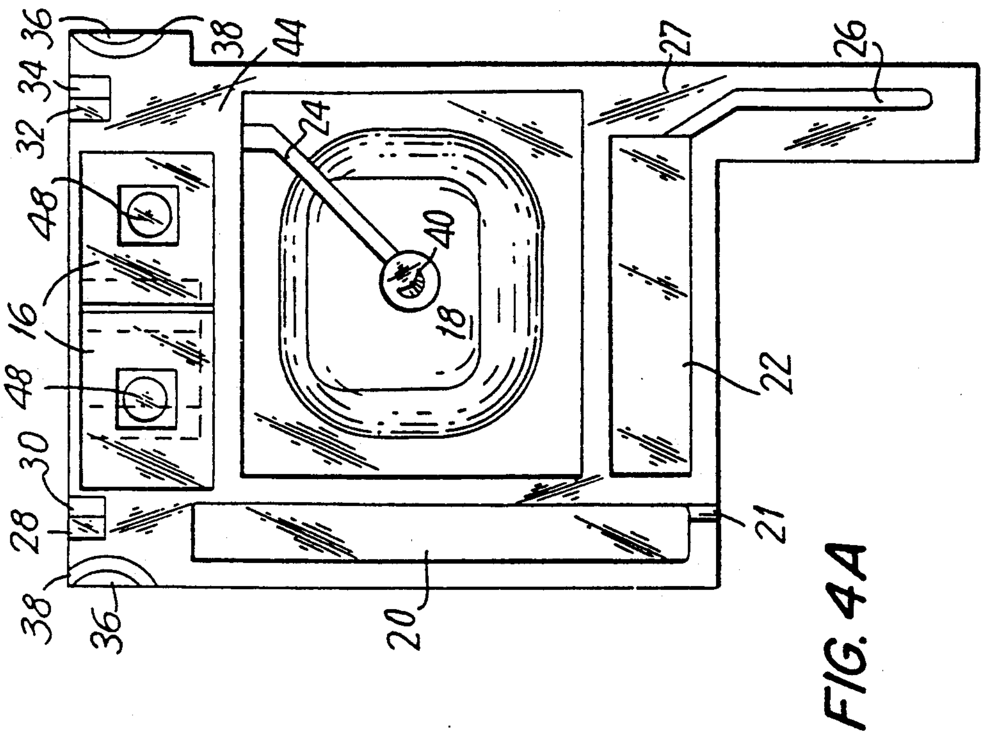
FIG. 4A
FIG. 4B
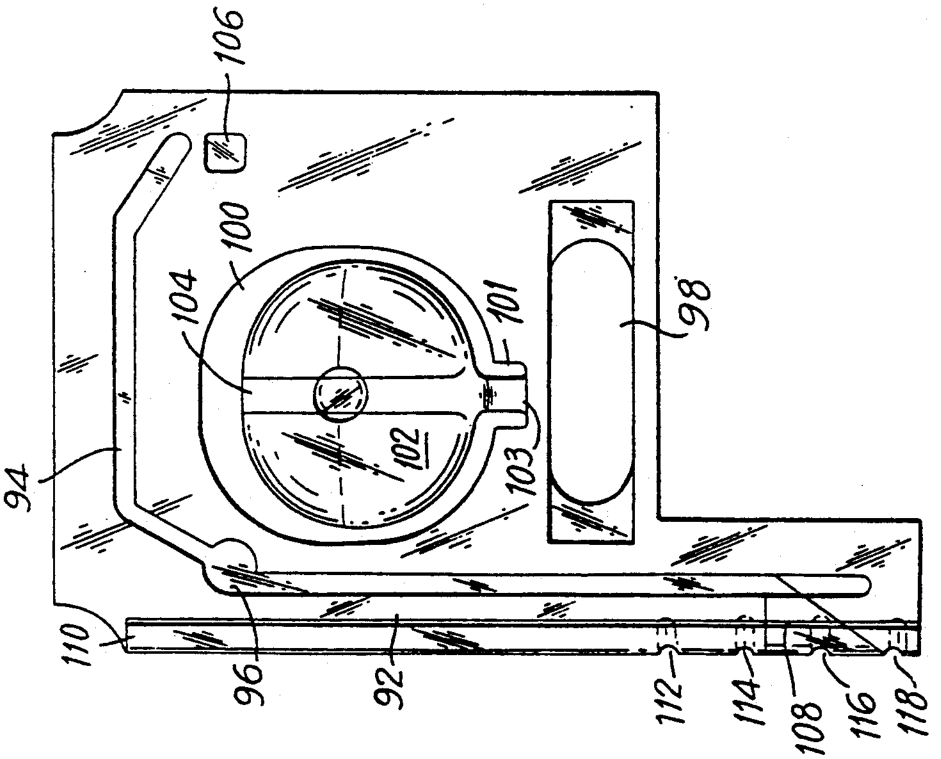

FIG. 8
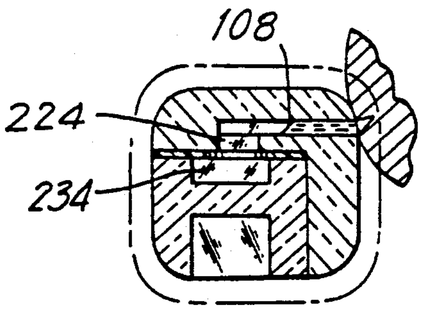
FIG. 9
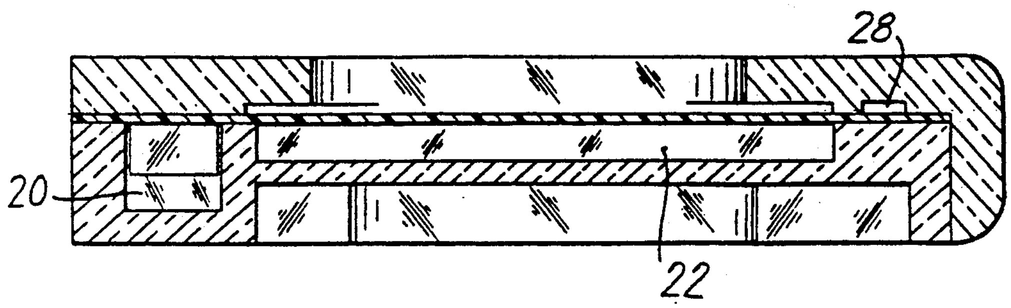
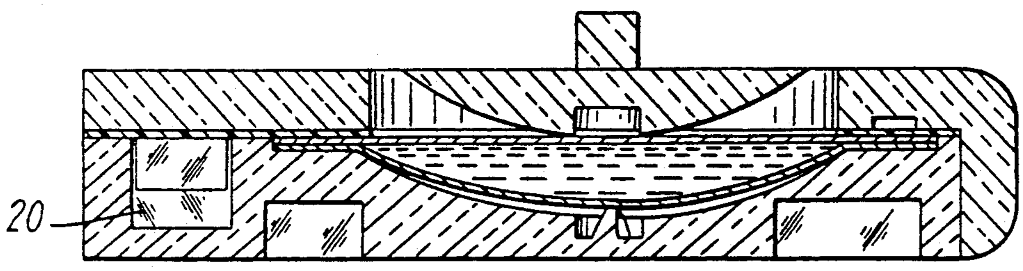
FIG. 10
FIG. 11
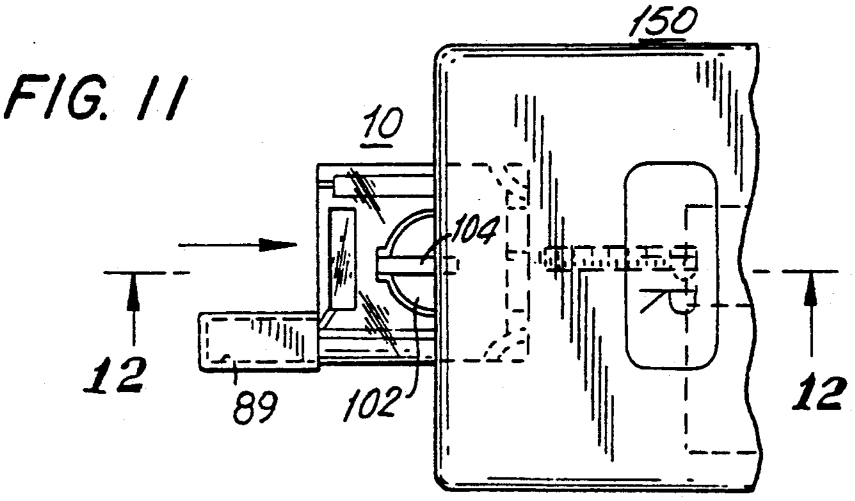

FIG. 15
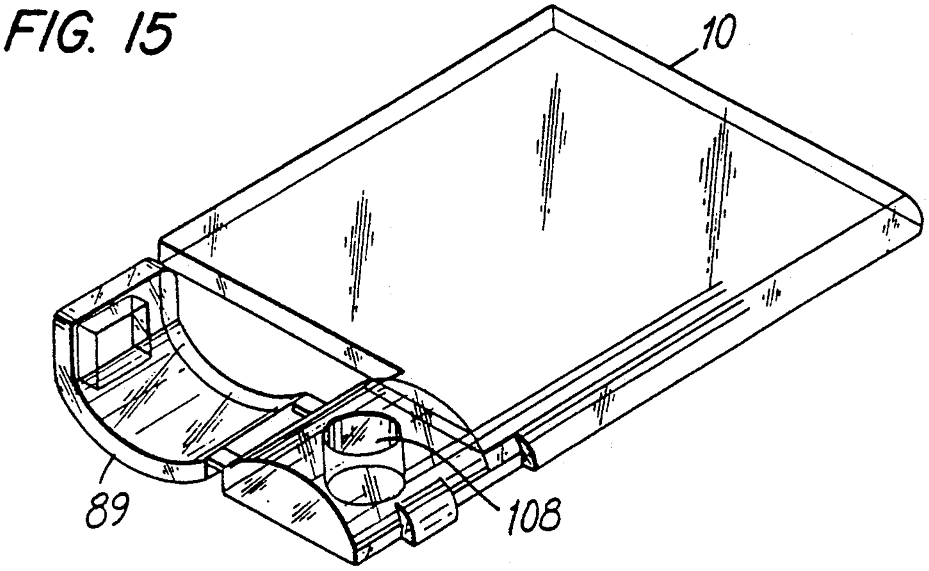
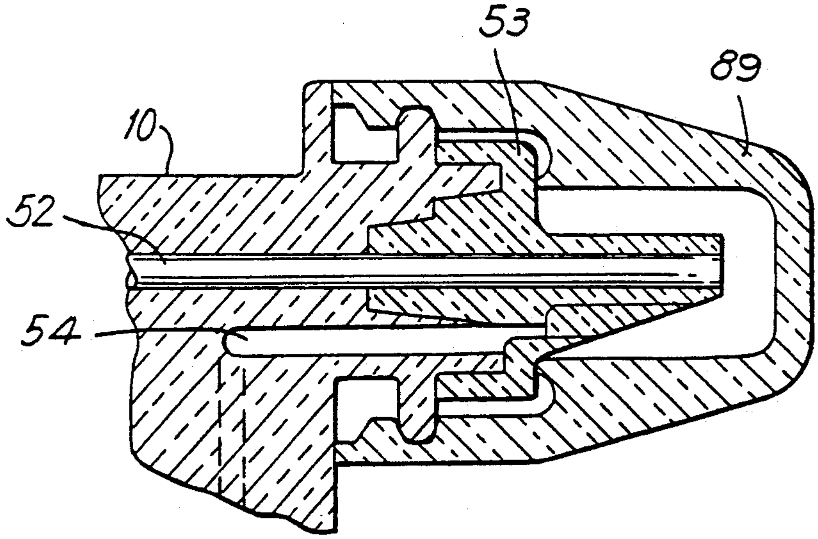
FIG. 16

DISPOSABLE SENSING DEVICE FOR REAL TIME FLUID ANALYSIS

BACKGROUND OF THE INVENTION

The testing of blood or other body fluids for medical evaluation and diagnosis has traditionally been the exclusive domain of large, well-equipped central laboratories. While such laboratories can offer efficient, reliable, and accurate testing of a high volume of fluid samples, using a wide range of simple through complex procedures, they cannot offer immediate results. A physician typically must collect samples, transport them to a private laboratory, wait for the samples to be processed by the laboratory, and wait still longer for the results to be communicated, producing delays often reaching several days between collection of the sample and evaluation of the test results. Even in hospital settings, the handling of the sample from the patient's bedside to the hospital laboratory, the workload and throughput capacity of the laboratory, and the compiling and communicating of the results can produce significant delays. A need exists for testing apparatus which would permit a physician to obtain immediate results while examining a patient, whether in the physician's office, in the hospital emergency room, or at the patient's bedside during hospital daily rounds.

Traditional laboratory equipment is not readily adaptable to this end. The size, expense, and complexity of such equipment is prohibitive in itself, but a difficulty of equal magnitude is the skill level required to operate such equipment. Highly-trained laboratory technicians must perform the measurements in order to assure the accuracy and reliability, and hence the usefulness, of the results. To be effective, a real-time analysis device must overcome this limitation, by providing fool-proof operation for a wide variety of tests in relatively untrained hands. For optimum effectiveness, a real-time system would require minimum skill to operate, while offering maximum speed for testing, high accuracy and reliability, and cost effective operation, through maximum automation. Ideally, a successful device would eliminate operator technique as a source of error by eliminating the need for manual intervention.

Several prior art devices, while functional, have nonetheless failed to offer a complete solution. For example, the system disclosed in U.S. Pat. Nos. 4,301,412 and 4,301,414 to Hill, et al., employs a disposable sample card carrying a capillary tube and two electrodes. The sample card is inserted into an instrument to read the electrical potential generated at the electrodes. While simple conductivity measurements can be made with this system, there is no provision for the full range of tests which would be desired by a physician. Similarly, the device of U.S. Pat. No. 4,756,884 to Hillman, et al., provides limited testing with a transparent plastic capillary flow card which permits external optical detection of the presence of an analyte.

Some prior art devices of more general utility suffer the disadvantage that excessive manual intervention is necessary in the testing process. For example, U.S. Pat. No. 4,654,127 to Baker, et al., shows a single use sensing device having species-selective sensors in a test chamber. The operator must manually fill a sample chamber with the sample to be tested, manually input data to a reading instrument through a keyboard, and respond to a prompt from the instrument by closing the sample chamber, manually rotating a cylindrical reservoir to dispense calibrant onto the sensors, and then manually inserting the device into the reading instrument. When prompted by the instrument, a further manual rotation of the reservoir releases the sample to the sensors. Although equipment of this sort is capable of performing a useful range of tests, the high number of manual operations involved in interacting with the instrument produces a correspondingly high number of opportunities for operator error in timing or technique, which may have a detrimental impact on the trustworthiness of the measurements performed.

SUMMARY OF THE INVENTION

In accordance with the preferred embodiments of the present invention, a disposable device is provided for performing a variety of measurements on blood or other fluids. The disposable device is constructed to serve a multiplicity of functions including sample collection and retention, sensor calibration and measurement. In operation, the disposable device may be inserted into a hand-held reader which provides the electrical connections to the sensors and automatically controls the measurement sequence without operator intervention.

In an exemplary embodiment of the invention, the disposable device includes upper and lower housing members in which are mounted a plurality of sensors and electrical contacts and a pouch containing a calibrant fluid. The sensors generate electric potentials based on the concentration of specific ionic species in the fluid sample tested. A double sided adhesive sheet is situated between the upper and lower housing members to bond the housing members together and to define and seal several cavities and conduits in the device.

A first cavity is located at the center of the device having a pin at the bottom of the cavity and a hinged disc at the top of cavity. A sealed pouch containing calibrant fluid resides in the cavity and a first conduit leads from this cavity toward the sensors. A second conduit has an orifice at one end for the receipt of a fluid sample while the other end of the tube terminates at a capillary break. A third conduit leads from the capillary break across the sensors to a second cavity which serves as a sink. The first conduit joins the third conduit after the capillary break and before the sensors. A third cavity functions as an air bladder. When the air bladder is depressed, the air is forced down a fourth conduit into the second conduit.

In operation, a fluid sample is drawn into the second conduit by capillary action by putting the orifice at one end of the conduit in contact with the sample. After the sample fills the second conduit, the orifice is sealed off. The pouch containing the calibrant fluid is then pierced by depressing the disc down on the pouch which causes the pin to pierce the other side of the pouch. Once the pouch is pierced, the calibrant fluid flows from the cavity through the first conduit to the third conduit and across the sensors at which time the sensor calibration is performed. Next, the air bladder is depressed forcing air down the fourth conduit to one end of the second conduit which forces the sample out the other end of the conduit, past the capillary break, and into the third conduit and across the sensors where measurements are performed. As this is done, the calibration fluid is forced out the third conduit into the second cavity where it is held. Once the measurements are made, the disposable device can be discarded.

The hand-held reader includes an opening in which the disposable device is received, and a series of ramps which control the test sequence and the flow of the fluid across the sensors. As the disposable device is inserted into the reader, the reader ruptures the pouch of calibrant fluid by depressing the hinged disc. The reader then engages the electrical contacts on the disposable device, calibrates the sensors, depresses the air bladder to force the fluid sample across the sensors, records the electric potentials produced by the sensors, calculates the concentration of the chemical species tested and displays the information for use in medical evaluation and diagnosis.

Thus, for example, to measure the pH of a patient's blood, the physician or technician pricks the patient's finger to draw a small amount of blood. The physician then puts the orifice of the device into the blood, drawing the blood into the device through capillary action. The physician then seals off the orifice and inserts the device into the reader. Upon insertion, a sequence of events is automatically initiated by the reader without intervention from the physician. The reader automatically causes the calibrant pouch to be punctured so that the calibrant fluid flows over the sensors, activating the sensors and providing the necessary fluid for calibration. The electrical contacts of the device are then automatically connected to the reader and the calibration measurements are automatically made. The reader then automatically depresses the air bladder in the disposable device causing the sample to flow over the sensors. The electric potentials generated by the sensors are read and the concentration of the chemical species is automatically calculated. The result is displayed or output to a printer for the physician to utilize.

Upon completion of the process, the physician removes the device from the reader and simply disposes of it. The reader is then ready to perform another measurement which is initiated by the insertion of another disposable device.

While use of the invention is particularly advantageous in the medical environment and will be described in that context, it will be appreciated that the invention may be practiced in any situation where it is desired to perform chemical analyses of fluid samples at speeds which approach real-time.

BRIEF DESCRIPTION OF THE DRAWINGS

FIG. 4A is a top view of the interior of the lower housing member of a preferred embodiment;

FIG. 4B is a bottom view of the interior of the upper housing member of a preferred embodiment;

FIG. 8 is a cross-sectional view along lines 8—8 of the disposable sensing device illustrated in FIG. 1;

FIG. 9 is a cross-sectional view along lines 9—9 of the disposable sensing device illustrated in FIG. 1;

FIG. 10 is a cross-sectional view along lines 10—10 of the disposable sensing device illustrated in FIG. 1;

FIG. 11 is a top view of a disposable sensing device partially inserted into a reader;

FIG. 15 is a perspective view showing a hinged snap-on cap; and

FIG. 16 is a cross-sectional view showing an imbedded glass capillary.

DETAILED DESCRIPTION OF THE PREFERRED EMBODIMENTS

Figure 1:
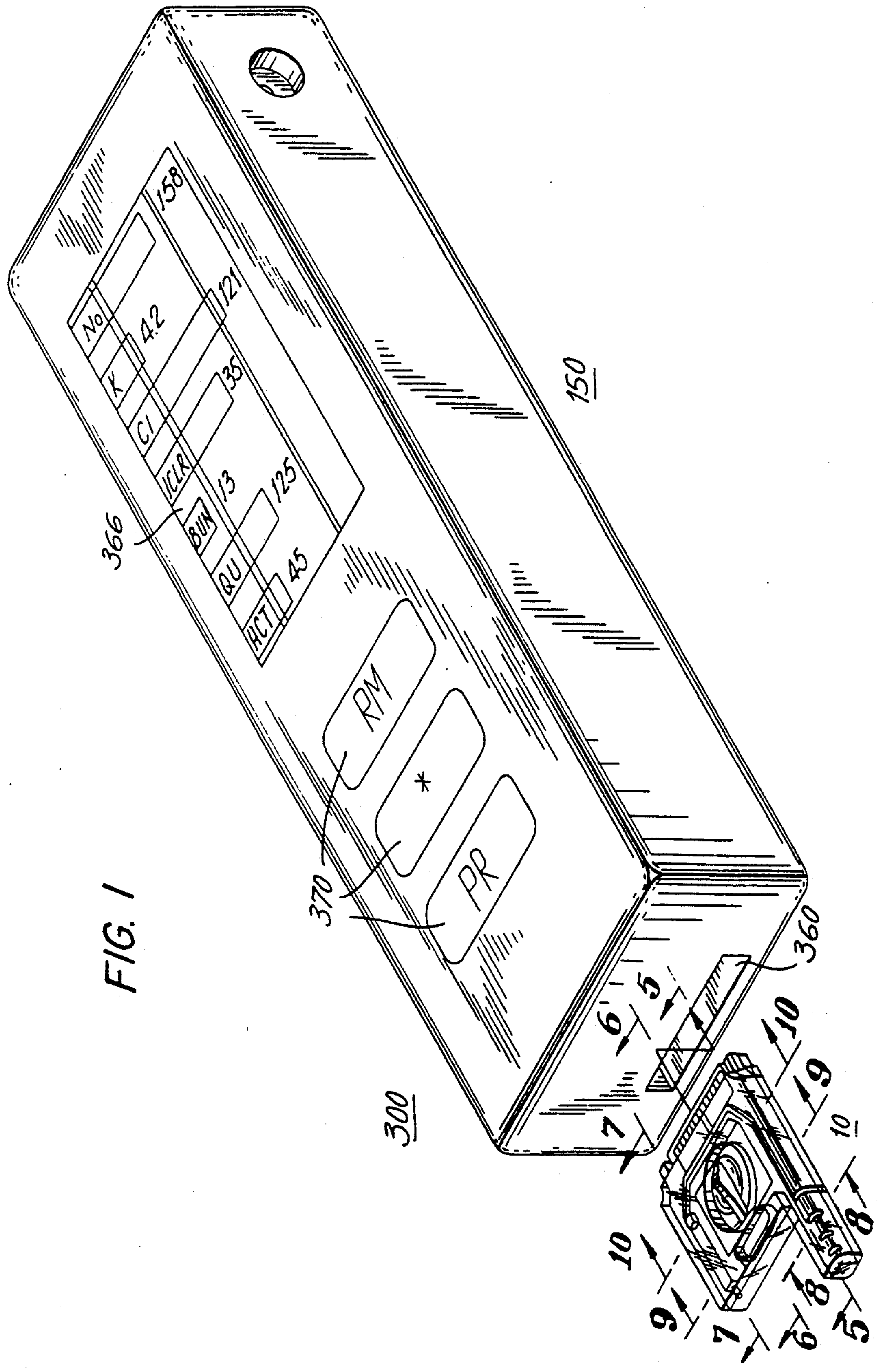
FIG. 1 is an isometric view of a disposable sensing device and reader according to the invention.

Referring to FIG. 1, the system 300 of the present invention comprises a self-contained disposable sensing device 10 and a reader 150. A fluid sample to be measured is drawn into device 10 and device 10 is inserted into the reader 150 through a slotted opening 360. Measurements performed by the reader are output to a display 366 or other output device, such as a printer.

The disposable device 10 contains sensing arrays 66 (FIG. 3) and several cavities 18, 20, 22 and conduits 220, 224, 228, 234 (FIGS. 2, 3, 4A and 4B) which perform sample collection, provide reagents for use in measurement and sensor calibration, and transport, fluids to and from the sensors.

Figure 2:
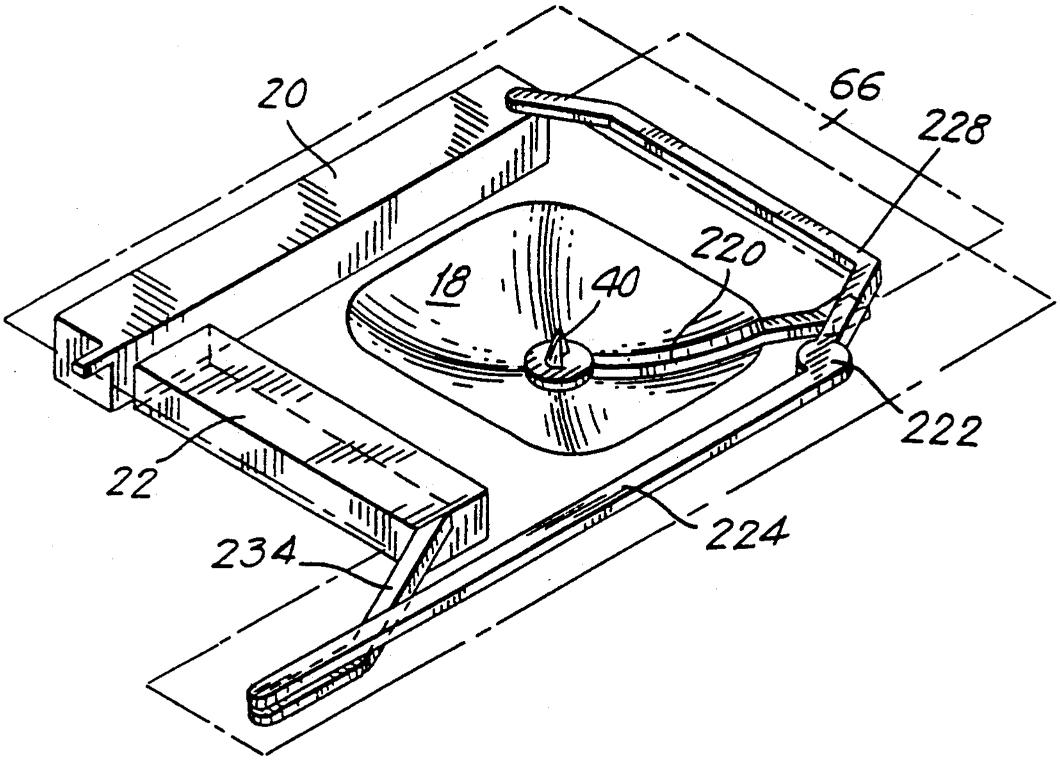
FIG. 2 is a schematic illustration of a disposable device illustrating the interconnection of conduits and cavities.
Figure 5:
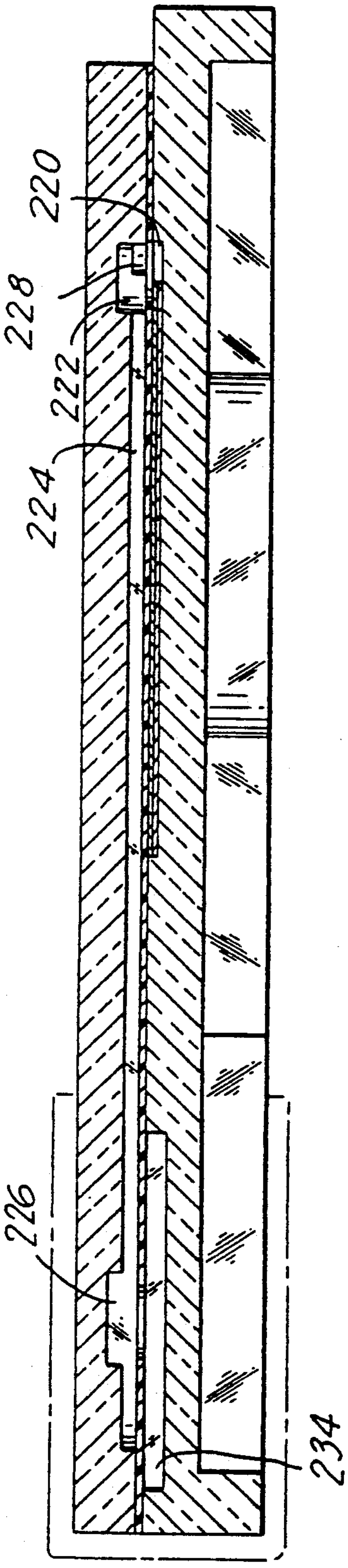
FIG. 5 is a cross-sectional view along lines 5—5 of the disposable sensing device illustrated in FIG. 1.
Figure 6:
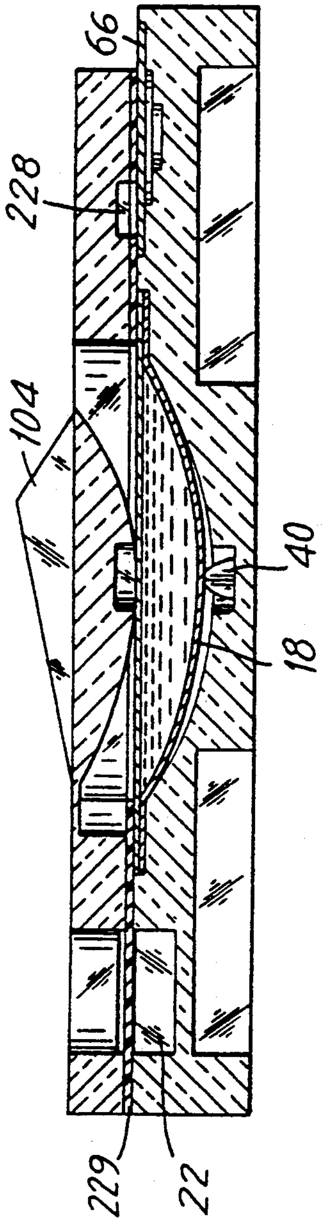
FIG. 6 is a cross-sectional view along lines 6—6 of the disposable sensing device illustrated in FIG. 1.
Figure 7:
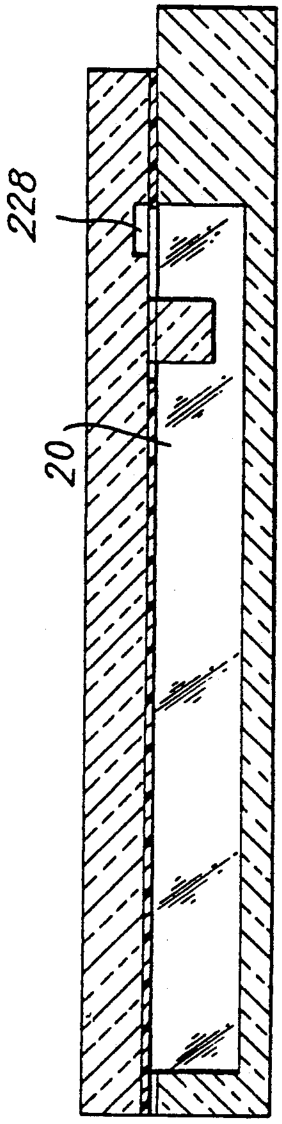
FIG. 7 is a cross-sectional view along lines 7—7 of the disposable sensing device illustrated in FIG. 1.

As shown in FIGS. 2, 4A, and 6 first cavity 18 is located in the center of the device 10 and has a pin 40 at the bottom of the cavity 18 and a hinged disc 102 at the top of the cavity. A sealed pouch 60 containing fluid to calibrate the sensors resides in the cavity 18 and a first conduit 220 (FIG. 2) leads from cavity 18. A second conduit 224 (FIGS. 2, 5) has an orifice 108 (FIG. 4B) at one end for the receipt of a fluid sample while the other end terminates at a capillary break 222. A third conduit 228 (FIG. 2) leads from the capillary break 222 past the sensing arrays 66 to a second cavity 20 which serves as a sink. The first conduit enters the third conduit between the capillary break and the sensing arrays. A third cavity 22 serves as an air bladder 229. When the air bladder 229 is depressed, air is forced down a fourth conduit 234 into the second conduit 224.

In operation, a fluid sample is drawn into the second conduit 224 by capillary action by putting the orifice 108 at one end of the conduit 224 in contact with sample. After the sample fills the second conduit 224, the orifice 108 is sealed. Optionally, reagents may be mixed into the sample for testing. The reagent may be mixed into the sample by pouring the reagent into the second conduit through the orifice. The reagent may optionally be placed on an adhesive sheet which borders the conduits. Dry reagents may be placed in any of the cavities or conduits, or even in the sensor chamber, as appropriate for the measurements to be performed.

The reagent pouch 60 is pierced by depressing the disc 102 down on the pouch 60 which causes pin 40 to pierce the other side of the pouch 60. The reagent in pouch 60 is chosen to suit the measurements to be performed; for simplicity of description, it will be assumed that a calibrant fluid is to be used to calibrate sensors prior to measurement, and that pouch 60 is filled with calibrant fluid. However, those skilled in the art will recognize that a calibrant will not be needed for all measurements, and that some measurements may require the presence of another aqueous reagent which may be conveniently stored in pouch 60.

After the pouch is pierced, calibrant fluid flows from the cavity 18 through the first conduit 220 to the third conduit 228 and across the sensors 66 at which time the sensor calibration is performed. Next, the air bladder 229 is depressed forcing air down the fourth conduit 234 to one end of the second conduit 224 which forces the sample out the other end of the conduit 224, past the capillary break 222 and across the sensors where measurements are performed. As this is done, the calibration fluid is forced out of the third conduit 228 into the second cavity 20 where it is held.

Figure 3:
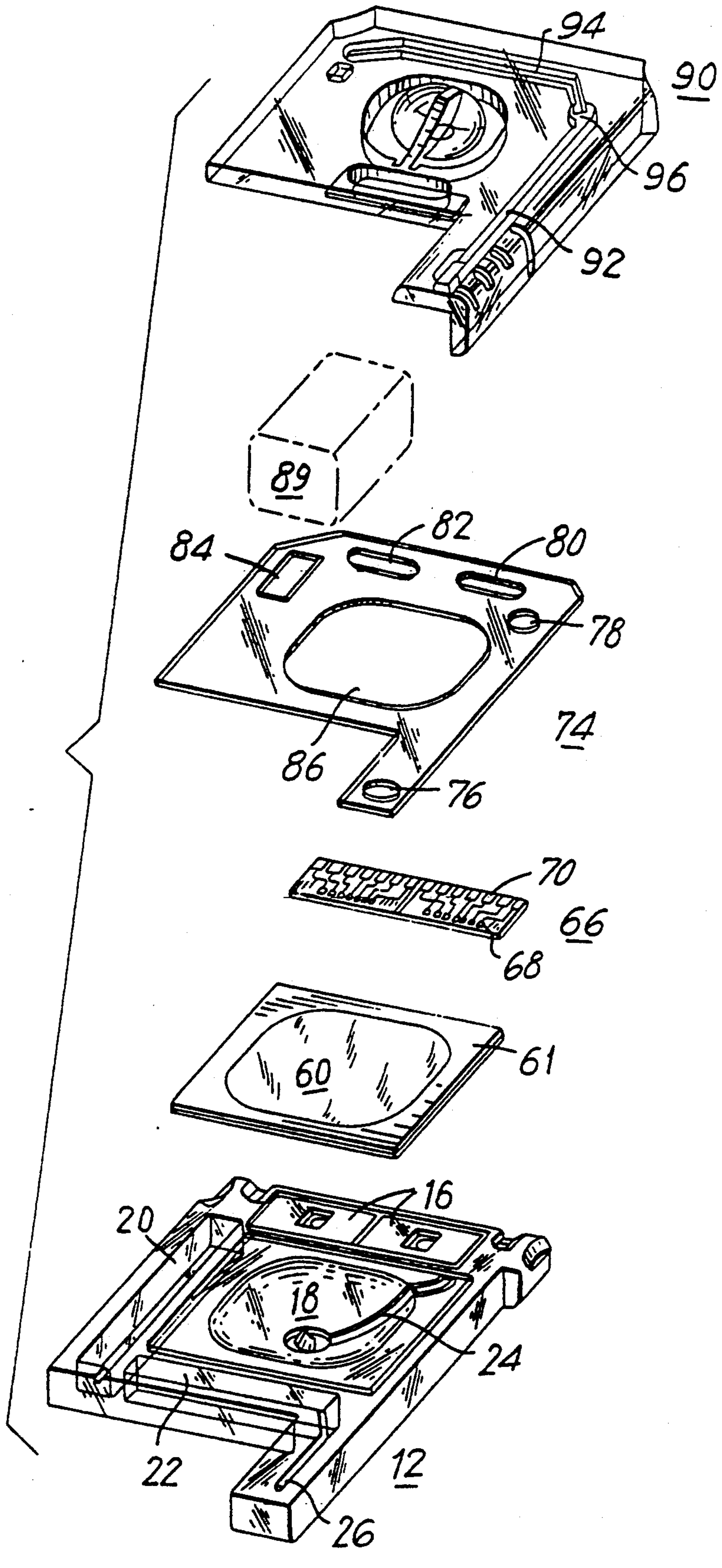
FIG. 3 is an exploded isometric view of a disposable sensing device according to the invention.

Referring to FIG. 3, disposable sensing device 10 may be formed of five primary parts: a lower housing member 12, a calibrant pouch 60, sensing arrays 66, an adhesive sheet 74 and an upper housing member 90. The calibrant pouch 60 is situated in a cavity 18 located on the lower housing member 12. Similarly, sensing arrays 66 are mounted in two sensor receptacles 16. Receptacles 16 contain adhesive to fasten the sensing arrays 66 to the lower housing member 12. The adhesive sheet 74 includes a layer of adhesive on both sides to adhere the lower housing member 12 to the upper housing member 90 and has a plurality of apertures 76, 78, 80, 82, 84, 86 which will be discussed below. The adhesive sheet 74 further functions to seal and define several conduits and containment areas formed when the device is assembled.

FIG. 4A is a top view of the lower housing member 12. As shown therein, the lower housing member 12 provides a plurality of cavities 18, 20, and 22, an air vent 21, grooves 24, 26, notches 28, 30, 32, 34, 36, 38, a pin 40 and receptacles 16 and 48. The lower housing member may be constructed using a translucent material that permits visual inspection of the fluid drawn into the device.

First cavity 18 is of a size and shape such that the calibrant pouch 60 fits into the cavity 18 and the surface of the pouch conforms with the internal surface of the lower housing member 12. Preferably the first cavity 18 is approximately the same size and shape as the calibrant pouch 60. A flat region 44 surrounds cavity 18 and is sized to receive a flange 61 which supports and shapes pouch 60.

Figure 14B:
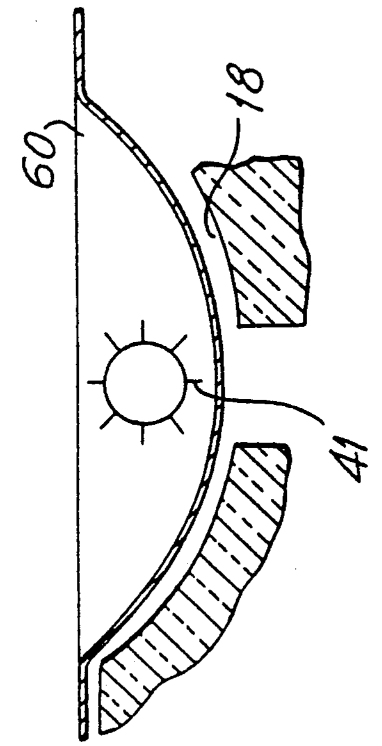
FIGS. 14A, B are cross-sectional views of two configurations for a penetrating point carried within a reagent pouch.
Figure 14A:
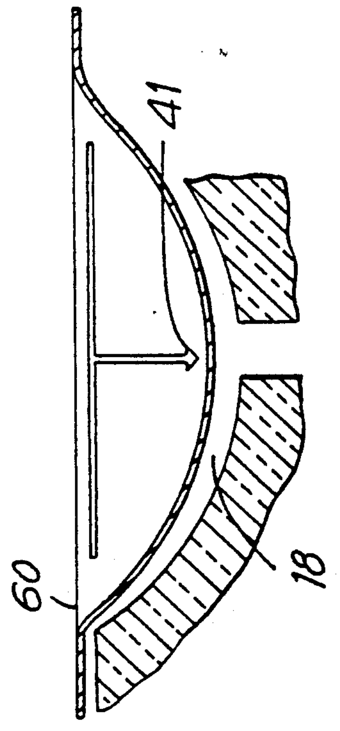

On the bottom of the first cavity 18 is pin 40 which is used during processing to pierce pouch 60 and thereby release the calibrant fluid. Preferably the pin 40 is conical in shape and located in the center of the cavity 18. Alternatively, a point for penetrating the pouch may be enclosed within the pouch itself. FIGS. 14 A, B show two suitable configurations for a rupturing point 41 so enclosed.

A first groove 24 is defined extending from the first cavity 18 to the outer edge of flat region 44 on the side of the device where the sensing arrays 66 are located. The first groove 24 forms first conduit 220 (FIG. 2) which permits the calibrant fluid to flow out of the first cavity 18.

Second cavity 20 is defined in the interior surface of the lower housing member 12, preferably in close proximity or adjacent to receptacles 16, to receive the overflow of fluids from the third conduit 228. An air vent 21 relieves air pressure in cavity 20. Although the air vent 21 is illustrated as located on a side surface of the lower housing member 12, it may also be located on the top exterior surface of the upper housing member 90. Thus, if the air vent 21 and orifice 108 are both located on the exterior surface of the upper housing member 90, the air vent 21 and orifice 108 may be sealed simply with a single piece of adhesive tape.

Third cavity 22 is defined in the interior surface of the lower housing member 12. This cavity 22 is used to store air and functions as an air bladder 229 that is formed when the adhesive sheet 74 is placed on the internal surface of the lower housing member sealing the cavity. Although the cavity 22 may be of any shape, it may conveniently be made rectangular.

A second groove 26 is connected to the third cavity 22 and extends outward in a handle 27 in housing 12 to connect to a groove 92 (FIG. 4B) located on the interior of upper housing member 90. When adhesive sheet 74 is in place, the groove 26 forms the fourth conduit 234 which provides the outlet for the air from cavity 22.

As stated previously, sensor receptacles 16 are located on the interior of the lower housing member 12. The receptacles 16 provide the location for sensing arrays 66 and assist in their placement. Preferably the receptacles 16 are approximately the same size as the sensing arrays 66. Within sensor receptacles 16 are adhesive receptacles 48, where adhesive is placed to adhere the sensing arrays 66 to the lower housing member 12.

Sensing arrays 66 measure the specific chemical species in the fluid sample being tested. Preferably each of the sensing arrays comprises an array of conventional electrical contacts 70, an array of electrochemical sensors 68 and circuitry for connecting individual sensors to individual contacts. The electrochemical sensors 68 are exposed to and react with the fluid sample to be measured generating electrical potentials indicative of the measurements being performed. The electrical potentials are output on the electrical contacts 70 which connect to an electrical connector of reader 150 for the transmission of electrical potential values. The reader then performs the necessary calculations to display the concentration of the results of the measurement.

Preferably, the electrochemical sensors 68 are constructed dry and when the calibrant fluid flows over the electrochemical sensors 68 the sensors easily "wet up" and are operational and stable for calibration and composition measurements. These characteristics provide many packaging and storage advantages including a long shelf life.

Although any type of sensor can be used which can fit within the spatial constraints of the device 10, it is most preferred that the electrochemical sensing arrays are thin-film devices which are suitable for microfabrication. Examples of microfabrication of such devices are described in U.S. Pat. No. 4,739,380.

Notches 28, 30, 32 and 34 are utilized to code device 10 to automatically indicate to reader 150 the ionic species to be analyzed. In particular, disposable devices having different notch patterns but otherwise the same physical shape are used for different types of tests. This method of coding and the interrelationship between the notches and the electrical connector are described in U.S. Pat. No. 4,954,087 issued Sept. 5, 1990. The notches function as a key means which engages with the movable portions of the electrical connector in reader 150. These portions detect the placement of the notches s that the appropriate circuitry in the reader can determine therefrom the chemical species to be analyzed from the electrical potentials received from the electrical contacts 70 on the device 10. Thus, the disposable device and reader of the present invention automatically determine the test(s) to be performed.

Concentric circular notches 36 and 38 are used to align the device when placed in the system. The notches 36, 38 provide the necessary registration of the electrical contacts 70 with the electrical connector in the reader 150 to achieve electrical contact and communication. Although the notches 36 and 38 are illustrated as concentric circular notches, the notches 36 and 38 may be of any size and shape so as to enable the alignment of the device in the system.

In this embodiment, pouch 60 is a sealed pouch containing calibrant fluid to calibrate the sensing arrays. The pouch has a flange portion 61 which shapes and supports the pouch 60 and is made of a material which is strong enough to store the calibrant fluid but can be punctured by pin 40 when required to release the fluid to calibrate the sensing arrays. Since the calibrant fluid is self-contained in each device, the sensing arrays are automatically calibrated prior to performing each test thereby assuring the accuracy of the measurements.

Pouch 60 may be conveniently formed as a foil pack. By using a multi-layer metal and plastic laminate for the foil, the pack may be shaped pneumatically, or may be mechanically formed using male and female dies. Hermetic sealing of the calibrant, or other reagent, may be easily accomplished by heat sealing the pack. The resulting structure provides good shelf life for the disposable sensing device, while permitting rupture, deformation, and evacuation of the contents through cooperation with the reader.

Referring to FIG. 4B, the upper housing member 90 comprises grooves 92, 94, a cavity 96, apertures 98, 100, a disc 102, wedge 104, tab 106, orifice 108, flange 110 and notches 112, 114, 116, 118. The upper housing member 90 may be constructed of the same translucent material as the lower housing member 12 so the fluids may be visually observed in the device.

Third groove 92 forms the second conduit 224 with adhesive sheet 74 and is used to store the fluid sample to be tested. The groove 92 is positioned such that the distal end of the second groove 26, located on the internal surface of the lower housing member 12, meets one end of groove 92 thereby connecting the third cavity 22, which forms the air bladder 229, to the second conduit. The ingress of air from the air bladder into the second conduit 224 forces the sample out the other end of the conduit 224, as will be discussed subsequently. The groove 92 has a length and diameter to form a capillary such that the fluid sample enters the conduit 224 through capillary action and is large enough to store an amount of the sample sufficient to perform the measurements required.

A flange 110 extends along one side of the upper housing member 90 to engage and mate with the lower housing member 12. A tab 106 is also used to mate the upper and lower housing members 12, 90. The tab 106 is located on the interior surface and is positioned to snugly fit into the second cavity 20. The height of the tab 106 is less than the depth of the cavity 20 to permit the flow of fluid through the cavity.

An orifice 108 is located approximately at the one end of the third groove 92 for the uptake of the fluid sample into the second conduit 224 formed by groove 92. Although FIG. 4B illustrates an orifice 108 located on a flange 110, the orifice may also be, located on the upper surface of the upper housing member 90. It is preferred that the orifice 108 be triangular in shape with one of the sides of the triangle forming a slotted opening on the flange 110 and a corner of the triangle forming an opening in the second conduit 224. A plurality of shallow notches 112, 114, 116, 118 may also be located adjacent to orifice 108 to provide an uneven surface on handle 27 for better gripping.

At the other end of groove 92 is fourth cavity 96. This cavity 96 functions as a capillary break 222. Thus when a fluid sample enters the conduit formed by groove 92 through orifice 108, the sample moves through and fills the conduit until the sample reaches the capillary break. The capillary break serves to contain the sample of the composition in the conduit until the sample is forced across the capillary break by the ingress of air from the air bladder 229.

A fourth groove 94 is connected to cavity 96 and extends across the sensor area to terminate above the second cavity 20 located on the lower housing member 12. As a result, when the upper and lower housing members 12, 90 are mated together, the third conduit 228 formed by groove 94 and adhesive sheet 74 begins at the fourth cavity 96 and extends across the electrochemical sensing arrays 68 and ends at second cavity 20 which receives the overflow of fluids. Furthermore, as described above, the first conduit 220 formed by the first groove 24 connects to conduit 228 when the upper and lower housing members are mated together, such that the calibrant fluid flows through conduit 220 to the third conduit 228 and across the sensing arrays 68 to calibrate the sensing arrays.

A first aperture 98 aligns with the third cavity 22 when the upper and lower housing members are mated together. In the preferred embodiment, the aperture is oblong in shape and has approximately the same width as cavity 22 but is shorter in length.

A second aperture 100 concentrically aligns with the first cavity 18 when the upper and lower housing members are mated together. Preferably the aperture is approximately circular in shape and about the same size as first cavity 18, and has a notch portion 101 along one edge.

A disc member 102 is located within the second aperture 100. Preferably the disc 102 is concentrically located within aperture 100 and is attached to the upper housing member 90 by a hinge member 103. The disc 102 is smaller than aperture 100 and is preferably circular in shape. The hinge member 103 permits the disc 102 to move up and down through the aperture 100. In addition, it is preferred that a wedge 104 be mounted on the exterior of the disc 102. As will be explained below, the wedge 104 is utilized during processing to depress the disc 102 through the aperture 100 and onto pouch 60 causing the pouch 60 to press against the pin 40 to puncture the pouch 60 and release the calibrant fluid. In addition, it is preferred that an indentation 105 be provided on the interior of disc 102 such that the top portion of pin 40 enters the indentation when the disc 102 is pressed through the aperture 100.

The exterior of upper housing member 90 may optionally provide for maintaining the sample at a constant temperature which is desirable for consistent measurements. This may be achieved with a thermally conductive material which contacts or is adjacent to the third conduit 228.

As discussed above, adhesive sheet 74 fastens the lower and upper housing members 12, 90 together, seals the grooves to form conduits and seals the third cavity to form air bladder 229. The adhesive sheet 74 is preferably constructed using a flexible material, formed to the same shape as the lower and upper housing members and containing a plurality of apertures 76, 78, 80, 82, 84 and 86. The adhesive sheet 74 may be a preformed sheet of double-sided adhesive or may be formed by applying a liquid or semi-liquid form of an adhesive on the internal surface of one or both housing members and subsequently curing the adhesive. Alternatively, a compressible elastomeric material, coated with appropriate adhesives, may be used. Furthermore, the adhesive sheet may optionally have reagents placed on one or both of the surfaces which react with the sample to prepare the sample for measurement.

Referring to FIG. 3, third aperture 76 is positioned to align with the distal end of conduit 234 and one end of conduit 224 to permit air to flow from conduit 234 into conduit 224. Fourth aperture 78 is positioned to align with the distal end of conduit 220 and a portion of groove 94 between capillary break 222 and the sensing arrays to permit the calibrant fluid to flow from the first conduit 220 to the third conduit 228. Fifth and sixth apertures 80 and 82 expose the electrochemical sensing arrays 68 to fluid in conduit 228 while sealing and protecting the electrical contacts 70 from fluid damage. Seventh aperture 84 is positioned to align with the distal end of groove 94 and cavity 20 to permit fluid to flow from the third conduit 228 to cavity 20. Advantageously, aperture 84 also aligns with tab 106 which fits through it into cavity 20. Eighth aperture 86 is positioned to align with aperture 100 and preferably is approximately the same size as aperture 100 so as to permit the movement of disc 102 through the aperture 100.

When device 10 is assembled, the adhesive surfaces of sheet 74 forms fluid-tight bonds with interior surfaces of upper and lower housing members 90, 12. As a result, grooves 26, 92 and 94 are covered to form conduits 234, 224 and 228, respectively; and cavities 20 and 22 are covered to form a fluid-tight reservoir and air chamber 229, respectively. At the various apertures, seals are formed which prevent fluid flow beyond the cross-sectional area of the aperture.

As shown in FIG. 11, a cap 89 is used to cover orifice 108 after the sample is received in the second conduit 224 to seal the orifice 108 and insure that the sample stored in the conduit 224 does not flow out of the orifice 108. The cap 89 is preferably constructed of a flexible material that fits easily but firmly over the orifice 108. Alternatively, a screw-on cap may be provided, with the necessary threads being placed on the end of the device. Another alternative is illustrated in FIG. 15, where a snap-on cap 89 is hinged to the device for convenience.

The advantages of the self-contained device of the present invention will be evident in the following description of the process flow.

To test, for example, a patient's blood, the physician or technician pricks the patient's finger to draw a small amount of blood and places the orifice 108 of disposable device 10 on the blood formed on the surface of the patient's finger. The blood is automatically drawn into the second conduit 224 by capillary action. Blood fills the conduit 224 up to the capillary break 222. Optionally, reagents are mixed with the blood sample in order perform certain measurements. The reagent may be inserted through the orifice 108 or may be placed on the adhesive sheet 74 prior to the assembly of the device. The physician or technician places a cap 89 over orifice 108, sealing the conduit 224 and inserts the device containing the blood sample into the reader of the present invention which performs the following steps.

As the disposable device is inserted into the reader, the reader depresses the disc 102, pressing calibrant pouch 60 onto pin 40, thereby causing the pin 40 to puncture the opposite side of the pouch 60. The calibrant fluid flows out of the pouch 60 through the first conduit 220, into the third conduit 228 and across the electrochemical sensing arrays 68 where measurements are taken to calibrate the sensing arrays. Once the sensing arrays are calibrated, the reader depresses the air bladder 229 formed by cavity 22 and adhesive sheet 74 forcing air down the fourth conduit 234 and into the second conduit 224. The air forces the blood sample across the capillary break 222 and into the third conduit 228. The blood sample flows over the electrochemical sensing arrays 68 and forces the calibrant fluid in the conduit 228 to overflow out of the conduit 228 and into the waste reservoir defined by cavity 20. The measurements are taken of the blood sample which contacts the electrochemical sensors 68 and electrical potentials indicative of the concentration of the chemical species are output on the electrical contacts 70. The electrical potentials are transmitted to the reader through an electrical connector and the reader performs the calculations to determine the concentration of the ionic species sensed. This information is output to a display device or printer for use by the physician to perform medical analysis or diagnosis.

Referring to FIG. 1, in a preferred embodiment, the reader 150 of the present invention is a hand held device comprising an opening 360 for the insertion of a self-contained sensing device, a display 366, program keys 370 and input/output port 380.

Preferably the display generates bar graphs indicative of the concentration of the species detected for quick and easy analysis by the physician. The input/output port 380 is used to connect to an external device such as a printer, for a printed output, a storage device for storage of the data, or a computer which may perform further analysis. The input/output port 380 may transmit data optically or electrically. Preferably the input/output port is compatible with a standard computer peripheral interface for laboratory equipment.

Figure 12:
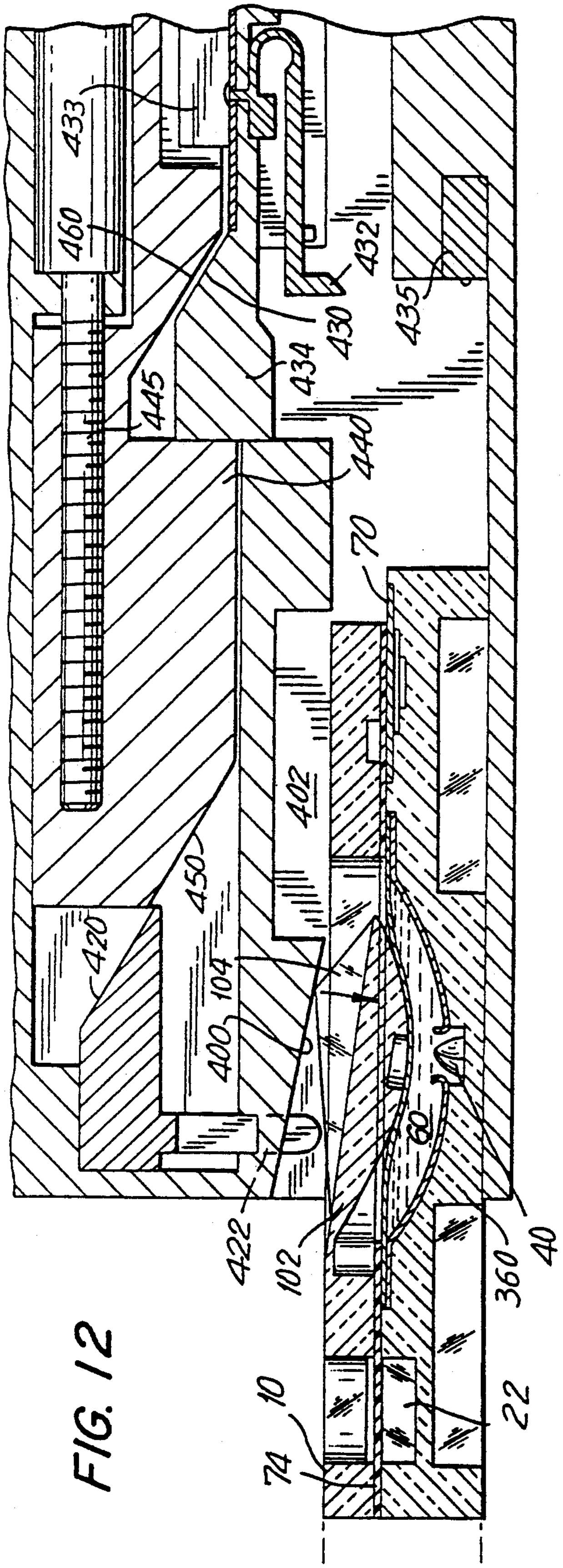
FIG. 12 is a cross-sectional view of a reader with a disposable sensing device partially inserted.
Figure 13:
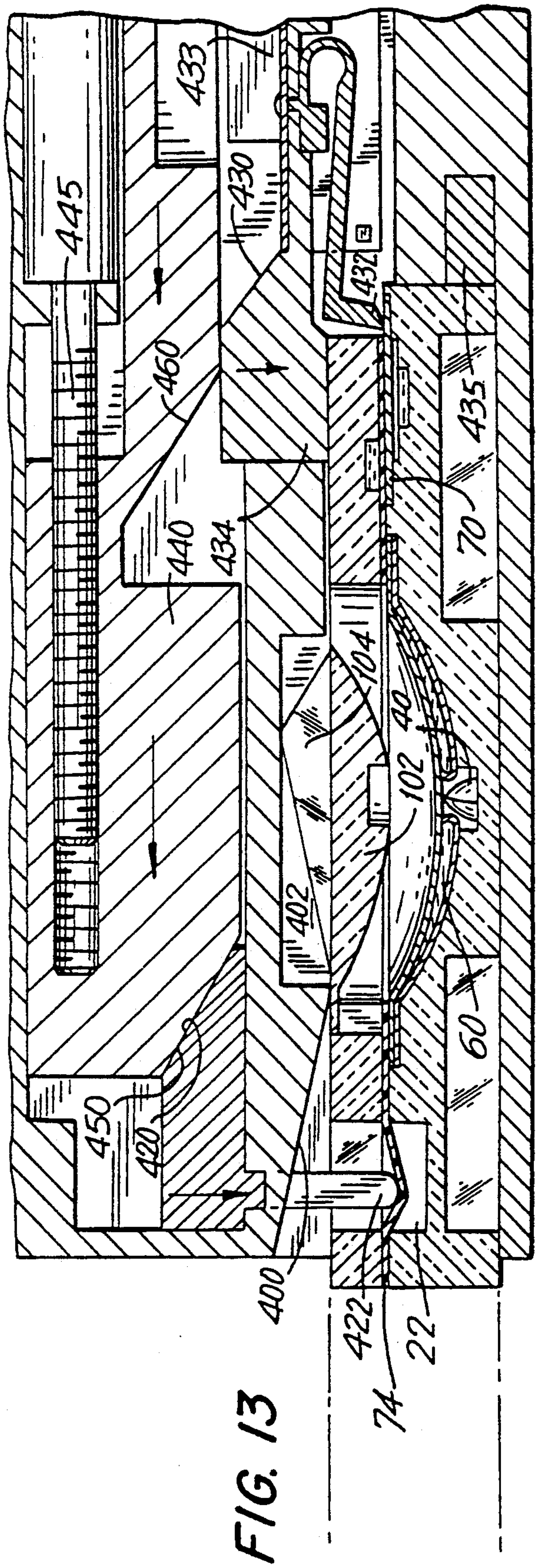
FIG. 13 is a cross-sectional view of a reader with a disposable sensing device fully inserted.

The reader controls the sequence of operations in the self-contained disposable sensing device 10. As illustrated in FIGS. 11–13, the control mechanism for reading the disposable sensing device 10 comprises ramp members 400, 420, 430 and lead screw mechanism 440.

When the disposable sensing device 10 is inserted in the slotted opening 360 as further illustrated in FIGS. 11, 12 and 13, the wedge 104 on the disc 102 engages a first ramp member 400 which causes the disc 102 to press downward on calibrant pouch 60 whereby the pouch 60 presses on pin 40 causing the pin 40 to pierce the pouch 60, releasing the calibrant fluid. A cavity area 402 is provided at the end of ramp member 400 to permit the disc 102 to spring back to its original position as shown in FIG. 12, once the device 10 is fully inserted into the reader 150. When the device is inserted, the front of the device hits a switch 435 which engages the lead screw motor mechanism.

The lead screw motor mechanism (not shown) which is engaged upon insertion of the disposable sensing device 10, turns a lead screw 445. The motor moves the lead screw mechanism 440 from its first or rest position, as illustrated in FIG. 12, forward towards the slotted opening 360 of the reader 150.

As the lead screw mechanism moves, ramp members 450 and 460 of the lead screw mechanism 440 engage respectively with ramp members 420 and 430. Ramp member 420 is attached to tab member 422 which is positioned to move downward to depress the air bladder 229, in disposable device 10. Ramp 430 is attached to electrical connector 434 having electrical contacts 432 and signal amplifier 433. Preferably the electrical connector 434 includes a means for determining the tests to be performed from the placement of notches 28, 30, 32, 34 on device 10. The electrical contact 432 are positioned to move downward to touch the electrical contacts 70 on device 10. The relative timing and sequence of the movement of tab member 422 and electrical connector 434 is controlled by the reader 150. The electrical connnector 434 is pressed down first to connect to the electrical contacts 70 on the device 10. Once the reader 150 has determined that the sensing arrays 66 are providing stable and calibrated output tab member 422 is pressed downward.

Thus, as the lead screw mechanism 440 moves forward towards the slotted opening 360, ramp member 460 engages ramp member 430 and ramp member 450 engages ramp 450. Ramp member 460 forces the electrical contact 432 of connector 439 to touch the electrical contact portion 70 of the device 10 forming an electrical connection between the device sensing arrays 66 and the reader 150. The lead screw mechanism is then stopped. The calibrant fluid released when the device 10 was inserted flows across the electrochemical portion 68 of sensing arrays 66 which "wets up" the sensing arrays 66 bringing the sensing arrays into operation. The signals from electrical contacts 70 are received through electrical contacts 432 and amplified by amplifiers 433 for subsequent processing in the reader 150. The reader checks the electrical signals output by sensing arrays 66 and signals the lead screw mechanism 440 to continue moving forward once the electrical signals output by sensing arrays 66 have stabilized and the sensing arrays are calibrated. The mechanism 440 continues to move causing ramp member 450 to depress tab member 422 on the air bladder 229 forcing the air stored in the air bladder 229 into the fourth conduit 234 to the second conduit 224. The air forces the fluid sample out of the second conduit 224, through the capillary break 22, into the third conduit 228 and across the electrochemical sensors 68, from which the measurements can be made.

Once the measurement information is taken by the reader 150 the lead screw mechanism 440 reverses direction to its initial position and tab member 422 and electrical connector 424 are retracted. At this point the sensing device is removed by the physician and disposed of.

Several particularly useful variations on the basic themes set forth above are possible. For example, in some applications, it may be desirable to exploit the characteristics of glass capillary tubes rather than relying upon capillaries formed from the structure of the device itself. To that end, a glass capillary tube may be imbedded in the structure, as illustrated in FIG. 16. A glass capillary tube 52 has been substituted for the second conduit 224. A tip seal 53 is fitted, and a screw cap 89 completes the structure. Air passage 54 communicates with fourth conduit 234, to permit the air bladder to force the sample toward the sensors.

Another alternative involves controlling the flow of calibrant and sample fluids for optimizing the measurement process. One of the sensors in array 66 may be, for example, a conductivity sensor, which may be used by the reader to detect the arrival of fluids at the array. A conductivity change may be anticipated when the calibrant first arrives, when the sample later arrives, or when an air bubble appears over the sensors. If the reader determines that an air bubble has reached the sensing array, the lead screw mechanism can be used to move the disposable device, in cooperation with appropriate ramps in the reader, to further deform the calibrant pouch, or compress the air bladder, and ensure that fluid is displaced across the sensor to purge the bubble. Removal of the bubble can be similarly sensed, so that the reader can perform measurements with ample certainty that the proper fluids are over the sensing array. This process may be executed in a completely automatic fashion, so that no operator intervention is necessary to detect or to correct difficulties such as air bubbles in the fluids, thus enhancing the reliability of the measurements.

Devices according to the invention permit a wide variety of measurements to be performed with minimal demands on the operator. The operator need only select an appropriate disposable device for the intended tests, collect the sample, and insert the device into the reader. Release of calibrant for the sensors, timing of sample fluid arrival and of measurement, correction of defects such as air bubbles, mixing of the sample with reagents, and display of the results can all be performed rapidly and automatically, eliminating the inaccuracies which may result from reliance on operator intervention.

While the invention has been described in conjunction with specific embodiments, it is evident that there are numerous variations in the invention which will be apparent to those skilled in the art in light of the foregoing description.

We claim:

1. A disposable sensing device, adapted for insertion into reading apparatus, for sensing at least one component concentration in a fluid sample, comprising:

- a housing;
- at least one sensor located in a sensor region within the housing;
- sample retaining means within the housing, for retaining the sample out of contact with the sensor, prior to sensing;
- sample collection means within the housing including an orifice for drawing the sample into the sample retaining means;
- a sample conduit connecting the sample retaining means with the sensor; and
- sample displacement means for automatically displacing the sample by actively forcing the sample through the sample conduit and into contact with the sensor to permit sensing, the automatic displacement of the sample being under the control of the reading apparatus.

2. A disposable sensing device as in claim 1, wherein at least one of the sample retaining means and the sample conduit contains a dry reagent.

3. A disposable sensing device as in claim 1, wherein the sensor region contains a dry reagent.

4. A disposable sensing device as in claim 1, further comprising:

- a cavity within the housing for retaining an aqueous reagent out of contact with the sensor; and
- an aqueous reagent conduit for connecting the cavity with the sensor.

5. A disposable sensing device as in claim 4, wherein the aqueous reagent conduit includes a dry reagent.

6. A disposable sensing device as in claim 4, further comprising:

a sealed deformable aqueous reagent pouch within the cavity for retaining the aqueous reagent; and rupturing means for permitting aqueous reagent to leave the pouch.

7. A disposable sensing device as in claim 6 further comprising deforming means for deforming the pouch to displace the aqueous reagent through the aqueous reagent conduit into contact with the sensor.

8. A disposable sensing device as in claim 6 wherein the rupturing means includes a pin within the cavity.

9. A disposable sensing device as in claim 6 wherein the rupturing means includes a penetrating point within the pouch.

10. A disposable sensing device as in claim 6 wherein the pouch is a foil pack formed of metal-plastic laminate and heat sealed.

11. A disposable sensing device as in claim 10 wherein the pouch is pneumatically formed.

12. A disposable sensing device as in claim 10 wherein the pouch is mechanically formed.

13. A disposable sensing device as in claim 6 wherein the sample displacement means includes a deformable chamber for forcing the sample through the sample conduit.

14. A disposable sensing device as in claim 7 wherein the sample displacement means includes a deformable chamber for forcing the sample through the sample conduit.

15. A disposable sensing device as in claim 1 wherein the sensor is an electrochemical sensor.

16. A disposable sensing device as in claim 15 wherein the electrochemical sensor is a thin-film chip device.

17. A disposable sensing device as in claim 1 wherein the sample displacement means includes:

an air bladder within the housing connected to the sample retaining means; and sealing means to prevent escape of fluids through the sample collection means.

18. A disposable sensing device as in claim 17 wherein the housing comprises first and second members bonded together by a flexible membrane.

19. A disposable sensing device as in claim 18 wherein the air bladder is formed by a chamber within the housing enclosed by the flexible membrane.

20. A disposable sensing device as in claim 18 wherein the sensor includes an electrical contact for connection with the reading apparatus, and the flexible membrane further provides isolation of the electrical contact from exposure to fluids within the device.

21. A disposable sensing device as in claim 17 wherein the sealing means includes a screw-on cap.

22. A disposable sensing device as in claim 17 wherein the sealing means includes a hinged snap-on cap.

23. A disposable sensing device as in claim 1 wherein the sample collecting means and sample retaining means include a capillary tube.

24. A disposable sensing device as in claim 23 wherein the capillary tube is a glass capillary tube imbedded in the housing.

25. A disposable sensing device, adapted for insertion into reading apparatus, for sensing at least one component concentration in a fluid sample, comprising:

a housing;

at least one sensor located within the housing;

a cavity within the housing including a sealed deformable pouch for retaining an aqueous reagent out of contact with the sensor;

an aqueous reagent conduit for connecting the cavity to the sensor;

aqueous reagent displacement means under control of the reading apparatus for displacing the aqueous reagent from the cavity through the aqueous reagent conduit to the sensor;

sample retaining means within the housing, for retaining the sample out of contact with the sensor, prior to sensing;

sample collection means within the housing including an orifice for drawing the sample into the sample retaining means;

a sample conduit connecting the sample retaining means with the sensor; and sample displacement means for forcibly displacing the sample from said sample retaining means through the sample conduit and into contact with the sensor to permit sensing.

26. A disposable sensing device as in claim 25 wherein the aqueous reagent is a calibrant for the sensor.

27. A disposable sensing device as in claim 25 further comprising a ventable chamber for receiving overflow fluids from the sensor.

28. A disposable sensing device as in claim 25 further comprising fluid detecting means for detecting the arrival of fluids at the sensor for providing information to the reading apparatus for use in the control of the aqueous reagent displacement means.

29. A system for sensing at least one component concentration in a fluid sample, comprising reading apparatus and a disposable sensing device, the disposable sensing device including:

at least one sensor;

sample retaining means for retaining the fluid sample out of contact with the sensor prior to sensing;

sensor collection means including an orifice for drawing the sample into the sample retaining means;

a sample conduit connecting the sample retaining means with the sensor; and sample displacement means for automatically and forcibly displacing the sample through the sample conduit and into contact with the sensor to permit sensing;

the reading apparatus including:

receiving means for receiving the disposable sensing device;

control means for controlling the automatic displacement of the sample by the sample displacement means; and signal means for receiving information from the sensor.

30. A system as in claim 29, wherein:

the sample displacement means of the disposable sensing device includes an air bladder connected to the sample retaining means; and the control means of the reading apparatus includes compression means for compressing the air bladder.

31. A system as in claim 29, wherein the disposable sensing device includes:

a cavity with a pouch therein for retaining an aqueous reagent out of contact with the sensor;

an aqueous reagent conduit for connecting the cavity to the sensor; and aqueous reagent displacement means for displacing the aqueous reagent from the cavity through the aqueous reagent conduit to the sensor;

and the reading apparatus includes actuating means for actuating the aqueous reagent displacement means of the disposable sensing device when the disposable sensing device is received by the reading apparatus.

32. A system as in claim 29, wherein:

the sensor of the disposable sensing device is electrochemical; and the signal means of the reading apparatus includes an electrical connector for receiving an electrical signal from the sensor.

33. A system as in claim 29, wherein:

the disposable sensing device includes coding means for indicating what component concentration is to be sensed; and the reading apparatus includes test determining means for receiving the indications of the coding means.

* * * * *